United States Patent [19]
Schweizer

[11] Patent Number: 4,726,111
[45] Date of Patent: Feb. 23, 1988

[54] CHANGE HEAD FOR A TOOL CHANGE APPARATUS

[75] Inventor: Herbert Schweizer, Boenigheim, Fed. Rep. of Germany

[73] Assignee: Komet Stahlhalter und Werkzeugfabrick Robert Breuning GmbH, Besigheim, Fed. Rep. of Germany

[21] Appl. No.: 939,207

[22] Filed: Dec. 8, 1986

[30] Foreign Application Priority Data

Jan. 17, 1986 [DE] Fed. Rep. of Germany ... 8601048[U]

[51] Int. Cl.$^4$ .............................................. B23Q 3/157
[52] U.S. Cl. ..................................... 29/518; 414/729
[58] Field of Search .............. 29/568, 26 A; 409/233, 409/232; 414/744 A, 729, 736; 279/8, 7

[56] References Cited
U.S. PATENT DOCUMENTS

| | | | |
|---|---|---|---|
| 3,722,711 | 3/1973 | Seidel | 29/568 X |
| 3,817,541 | 6/1974 | Grabher et al. | 29/568 X |
| 4,300,278 | 11/1981 | Nomura et al. | 29/568 |
| 4,384,397 | 5/1983 | Nelson | 29/568 |
| 4,581,811 | 4/1986 | Elkle | 29/568 |
| 4,651,405 | 3/1987 | McMurtry | 29/568 |

*Primary Examiner*—William R. Briggs
*Attorney, Agent, or Firm*—Flynn, Thiel, Boutell & Tanis

[57] ABSTRACT

The change head (1) for a tool change apparatus is provided at its free end with a prism-shaped centering opening (15) and in the center thereof an axially displaceable screw driver (3). Arranged concentrically with respect thereto is a screwthreaded sleeve (9) which has a female screwthread and which is mounted slidably but non-rotatably in an axial bore (8) in the head (1) and which is urged towards the centering opening (15) by a spring (14). A respective radially displaceable clamping member (12) is provided in each of two radially extending bores (11) in the screwthreaded sleeve (9), the two radial ends of each clamping member being cones (12a, 12b) (or hemispheres). Axially movably arranged in the screwthreaded sleeve (9) is a clamping sleeve (13) which extends with its one (outer) end (13a) into the core bore of the female screwthread (10) and has a frustoconical portion (16) which co-operates with the radially inner ends (12a) of the clamping members (12) and which increases in diameter towards the outer end (13a). Provided in the wall (1b) of the bore of the head (1), in the region of the clamping members (12, 12'), is at least one inclined surface (18) which is inclined towards the free end (1a) of the head and the axis (A) of the screwthreaded sleeve (9) and against which the radially outer ends (12b) of the clamping members (12) bear.

5 Claims, 2 Drawing Figures

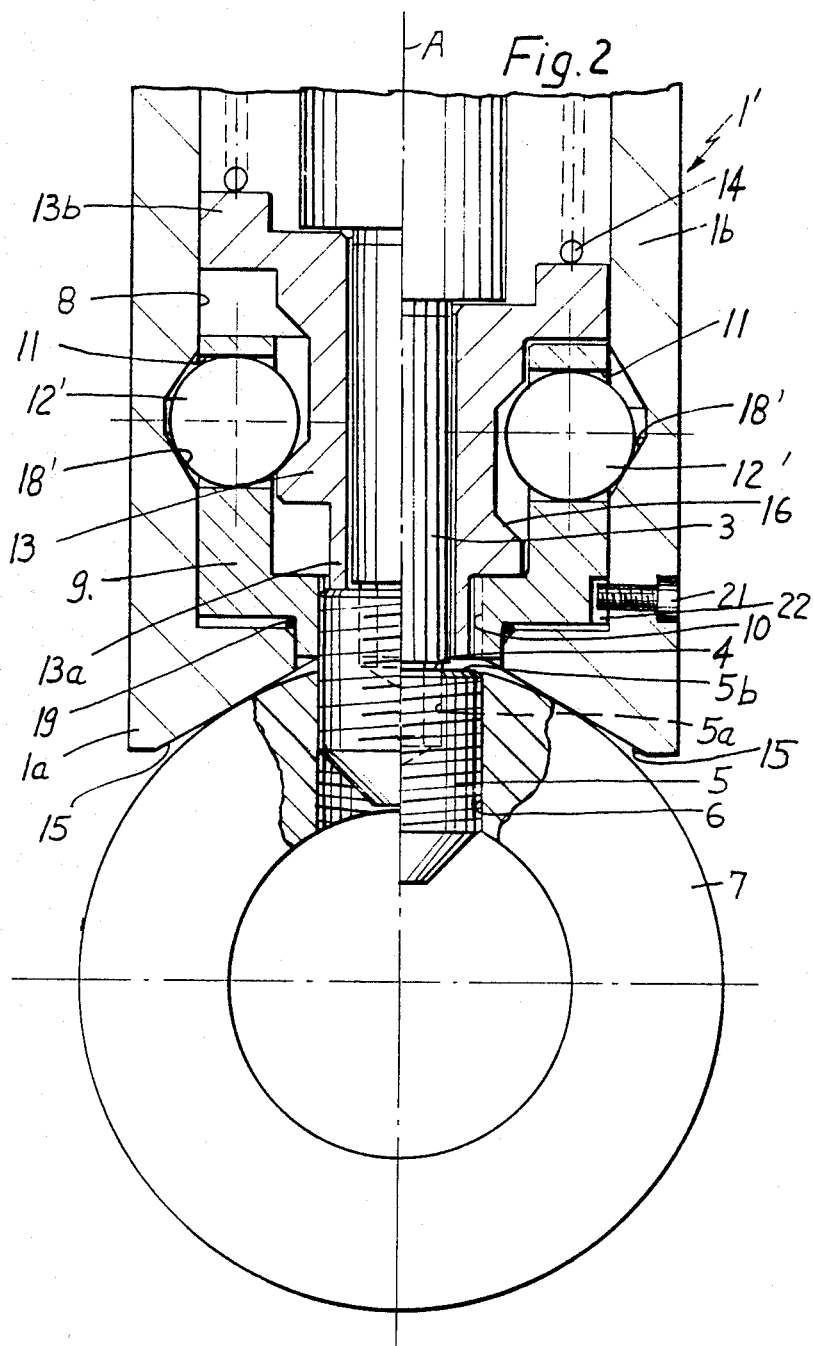

CHANGE HEAD FOR A TOOL CHANGE APPARATUS

The invention relates to a change head for a tool change apparatus, comprising a preferably prism-shaped centering opening provided at the free end of the head, an axially displaceable screw driver provided in the centre of the centering opening, and a screwthreaded sleeve which is arranged concentrically with respect to the screw driver and which has a female screwthread and which is mounted displaceably but non-rotatably in an axial bore in the head and which is urged by a spring towards the centering opening and which is movable by a clamping means in the opposite direction.

In a known change head of that kind (EP-A-125 529), provided on the screwthreaded sleeve is a piston which is displaceable in the bore in the head. The screwthreaded sleeve can be moved away from the centering opening by means of the piston when the screw driver has partially screwed into the female screwthread in the screwthreaded sleeve, a clamping screw which is screwed in the tool holder of the tool to be replaced. By virtue of displacement of the screwthreaded sleeve under the hydraulic pressure, the tool holder is urged firmly against the prism-shaped centering opening and is thus centered with respect to the change head and clamped thereto. That hydraulic-operation clamping means however requires a hydraulic pressure source and suitable control valves. In addition, problems are involved in the supply of pressure fluid to the change head which is disposed on a pivotable change arm, due to the pivotal movement of the change arm. The piston sealing means and a further sealing means of the screwthreaded sleeve are components which are liable to suffer from wear. Another disadvantage is that the hydraulic pressure must be constantly maintained as otherwise the clamping action between the change head and the tool holder loosens and the latter is no longer precisely oriented with respect to the change head, whereby replacement of tools is made impossible.

The invention is based on the problem of providing a change head for a tool change apparatus of the kind set forth in the opening part of this specification, which is of a simple construction and which is less liable to wear and in which the tool holder is always clamped and aligned with respect to the change head as long as the clamping screw of the tool holder is screwed into the screwthreaded sleeve.

According to the invention that is achieved in that a respective radially displaceable clamping member is provided in respective ones of at least two radially extending bores in the screwthreaded sleeve, the two radial ends of the clamping member being cones or hemispheres, that axially movably arranged in the screwthreaded sleeve is a clamping sleeve which extends with its one (outer) end into the core bore in the female screwthread and has a frustoconical portion which co-operates with the radially inner ends of the clamping members and which increases in diameter towards the outer end, that provided in the wall of the bore in the head, in the region of the clamping members, is at least one inclined surface which is inclined towards the free end of the head and the axis of the screwthreaded sleeve and against which bear the radially outer ends of the clamping members, and that the spring bears against the other (inner) end of the clamping sleeve.

In the change head according to the invention, the clamping means operates in a purely mechanical mode although the screw driver which is provided in any case and the clamping screw of the tool holder of a tool to be replaced is used for actuating the clamping means. The change head is thereby substantially simpler in design, in particular because the hydraulic system and the disadvantages that it involves are eliminated. As soon as the clamping screw is screwed over a sufficient length into the female screwthread in the inner screwthreaded sleeve by means of the screwdriver, the clamping screw comes to bear against the outer end of the clamping sleeve. When the clamping screw is further screwed into the female screwthread, the clamping sleeve is moved in the axial direction with respect to the screwthreaded sleeve. That causes the clamping members to be urged radially outwardly. The inclined surface or surfaces provided in the wall of the bore causes or cause a movement of the clamping members in the axial direction of the screwthreaded sleeve. In that way, the screwthreaded sleeve is moved away from the centering opening and thus the tool holder is clamped firmly against the centering opening of the change head. That clamping action can only be released again, after the tool holder has been fitted into the tool receiving means of a machine tool or a magazine, when the screwdriver screws the clamping screw out of the female screwthread in the screwthreaded sleeve again.

Advantageous embodiments of the invention are characterised in the subsidiary claims.

The invention is described in greater detail hereinafter with reference to embodiments illustrated in the drawings in which:

FIG. 2 is a view in axial section of a second embodiment of the change head.

Figure 1:
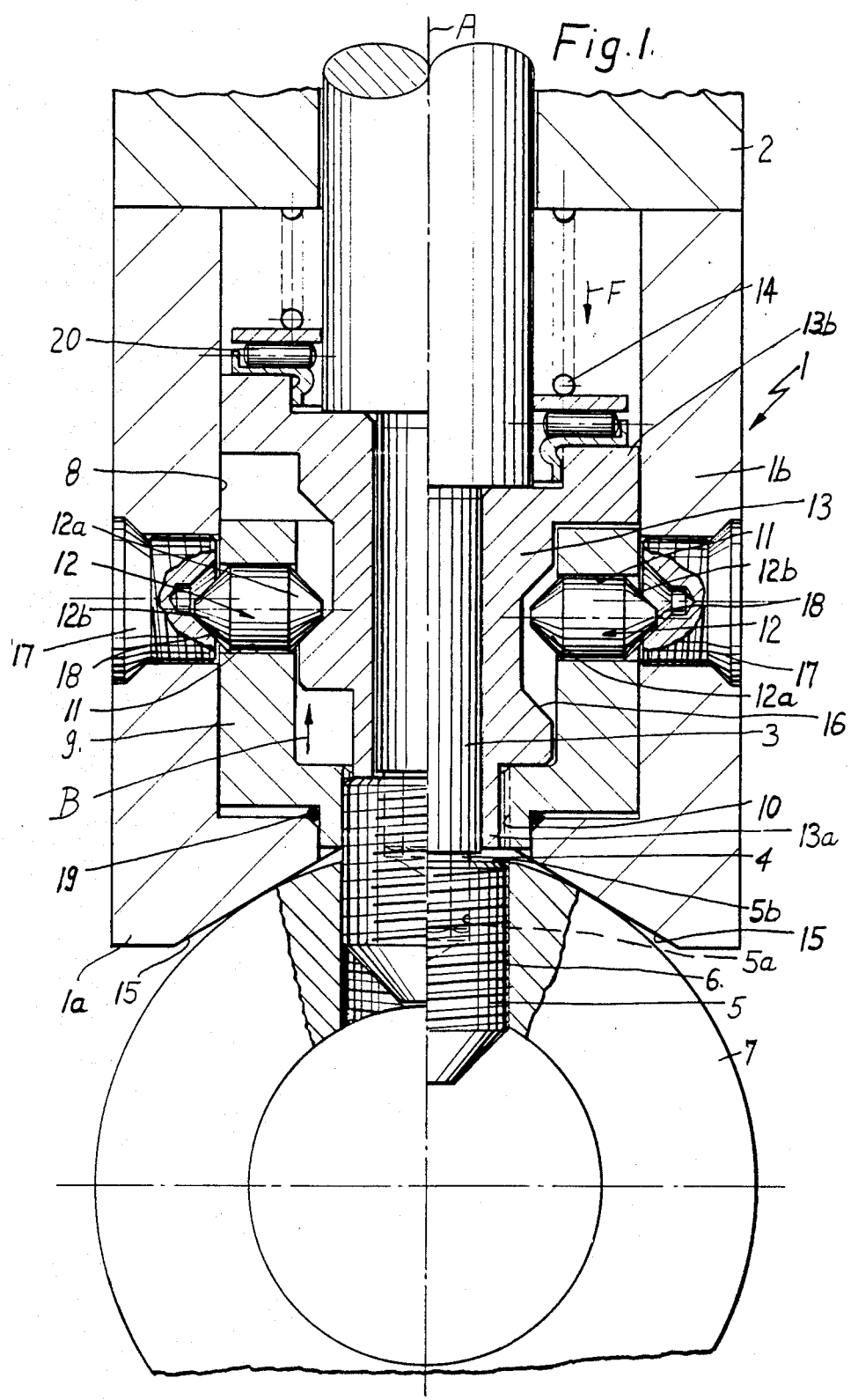
FIG. 1 is a view in axial section of a first embodiment of the change head.

In the drawings, reference numeral 1 denotes the whole change head which is arranged at the free end of a change arm 2 of a tool changer. Arranged centrally in the change head 1 is a screw driver 3 which can be rotated in two opposite directions of rotation and which at its free end has an entrainment member 4. In the tool change operation, the entrainment member 4 engages into the entrainment opening 5a in a clamping screw 5 which can be screwed in a screwthread 6 in the tool holder 7. The tool holder 7 can be connected by means of the clamping screw 5 to a tool receiving or mounting means (not shown) in a machine tool or a magazine.

The screwthreaded sleeve 9 is axially displaceably mounted in a bore 8 in the change head 1, which is disposed concentrically with respect to the axis A of the screw driver 3. The screwthreaded sleeve 9 has a female screwthread 10 which matches the screwthread on the clamping screw 5. The screwthreaded sleeve is provided with at least two but preferably three radially extending bores 11. When the sleeve has three bores 11, they are arranged in displaced relationship at 120° relative to each other. If the sleeve has only two bores, they are arranged in mutually diametrally opposite relationship. A clamping member 12 is radially displaceable in each of the bores 11. In the embodiment shown in FIG. 1, each clamping member 12 is a cylindrical pin having two frustoconical ends 12a and 12b.

A clamping sleeve 13 is also axially displaceable in the hollow screwthreaded sleeve 9. The clamping sleeve 13 extends with its one (outer) end 13a into the core bore of the female screwthread 10. A spring 14 acts on the other (inner) end 13b, in a direction F towards the free end 1a of the change head. A prism-shaped centering opening 15 is provided at the free end 1a of the change head.

The clamping sleeve 13 also has a frustoconical portion 16 which increases in diameter towards the outer end 13a. The frustoconical portion 16 co-operates with the inner ends 12a of the clamping members 12.

A screw 17 is screwed into the bore wall 1b in the region of each clamping member 12. At its inner end the screw 17 has a frustoconical recess 18. The lower part of the frustoconical recess 18 forms an inclined surface which is directed towards the axis A of the screwthreaded sleeve 9 and the free end 1a of the head. The radially outer end 12b of the associated clamping pin 12 bears against the inclined surface 18. An O-ring 19 of resilient material prevents dirt from penetrating into the arrangement.

The change head is shown in the released condition on the right-hand side of the drawing and in the clamping position on the left-hand side. In a tool change operation, the change head is moved in the direction of the axis A towards the tool holder 7 until the centering opening 15 bears against the cylindrical tool holder 7. The entrainment member 4 of the screw driver then passes into the entrainment opening 5a in the clamping screw 5 of the tool holder 7. By means of anticlockwise rotation of the screw driver 3, the clamping screw 5 is screwed partially out of the screwthread 6 in the tool holder and into the female screwthread 10 in the screwthreaded sleeve. In that case the outer end 5b of the clamping screw 5 bears against the outer end 13a of the clamping sleeve and, upon further screwing movement of the clamping screw 5 into the female screwthread 10, urges the clamping sleeve upwardly against the force of the spring 14. As soon as the clamping screw 5 is sufficiently screwed into the female screwthread 10, the frustoconical portion 16 comes to bear against the inner ends 12a of the clamping members 12. The clamping members 12 are thereby urged radially outwardly. Their frustoconical outer ends 12a slide outwardly and also upwardly against the inclined surfaces 18. As the clamping members 12 are guided in the radial bores 11, the screwthreaded sleeve 9 is moved upwardly in the direction B away from the free end 1a of the head, with the cylindrical tool holder 7 being pressed firmly against the prism-shaped opening 15. In that situation the opening 15 also provides for precise alignment of the tool holder 7 relative to the change head 1. As the clamping sleeve 13 rotates together with the clamping screw 5 at least during a part of the axial movement of the clamping sleeve, by virtue of its bearing against the clamping screw 5, a rolling bearing 20 is advantageously provided to reduce wear between the inner end 13b and the compression spring 14.

In the embodiment shown in FIG. 2, the same reference numerals are used in relation to components which are identical to those of the embodiment shown in FIG. 1. The reference numerals include a prime in relation to parts performing the same function. Therefore the foregoing description also applies in corresponding manner to the embodiment shown in FIG. 2 which differs only in regard to the configuration of the clamping members and the parts of the change head 1' which co-operate with the clamping members.

In the embodiment shown in FIG. 2, the clamping members 12' are in the form of balls. The inclined surface 18' in the wall 1b of the bore is formed by a turned recess therein, which tapers in a frustoconical configuration towards the free end 1a of the head. The outer parts of the balls 12' bear against the inclined surface 18'. A holding screw 21 which engages into an axial groove 22 in the screwthreaded sleeve 13 prevents the screwthreaded sleeve 13 from rotating relative to the change head 1'.

The embodiments of the invention in which an exclusive property or privilege is claimed are defined as follows:

1. In a change head for a tool change apparatus, comprising a preferably prism-shaped centering opening provided at a free end of said change head, an axially displaceable screw driver provided in the center of said centering opening, and a screwthreaded sleeve which is arranged concentrically with respect to said screw driver and which has a female screwthread and which is mounted displaceably but non-rotatably in an axial bore in said change head and which is urged by a spring towards said centering opening and which is movable by a clamping means in the opposite direction, the improvement comprising wherein a respective radially displaceable clamping member is provided in respective ones of at least two radially extending bores in said screwthreaded sleeve, the two radial ends of said clamping member being cones or hemispheres, wherein axially movably arranged in said screwthreaded sleeve is a clamping sleeve which extends with its outer end into said bore in said female screwthread and has a frustoconical portion which co-operates with radially inner ends of said clamping members and which increases in diameter towards said outer end, wherein provided in a wall of said bore in said change head, in the region of said clamping members, is at least one inclined surface which is inclined towards said free end of said change head and an axis of said screwthreaded sleeve and against which bear said radially outer ends of said clamping members, and wherein said spring bears against an inner end of said clamping sleeve.

2. The change head according to claim 1, wherein in the region of each clamping member a screw is screwed into said wall of said bore in said change head, said screw being provided with a conical recess at its inner end adjacent said clamping member.

3. The change head according to claim 1, wherein said inclined surface is formed by a turned recess in said wall of said bore, which recess tapers in a frustoconical configuration towards said free end of said change head.

4. The change head according to claim 1, wherein each clamping member is formed by a cylindrical pin having two frustoconical ends.

5. The change head according to claim 1, wherein each clamping member is a ball.

* * * * *